Patented Jan. 11, 1949

2,458,639

UNITED STATES PATENT OFFICE 2,458,639

VINYL COPOLYMER AND PROCESS FOR ITS PRODUCTION

Richard W. Quarles, Pittsburgh, Pa., assignor to Carbide and Carbon Chemicals Corporation, a corporation of New York No Drawing. Application October 13, 1944, Serial No. 558,609

5 Claims. (Cl. 260—43)

This invention relates to polyfunctional vinyl copolymers which contain chloro, hydroxyl, carboxyl and ester groups attached to the resinous macromolecule. All of these functional groups influence the properties of the vinyl copolymers, but the chloro group predominates. The carboxyl, hydroxyl and ester groups modify the properties of the copolymer in significant respects. In these copolymers, the functional groups are spaced at intervals along a chain of carbon atoms.

In forming these copolymers, the chloro, ester and carboxyl groups may be attached to the macromolecule by copolymerizing vinyl chloride, vinyl acetate and maleic acid to form a tri-component copolymer. Such copolymers may be formed according to known methods, as described in Campbell Patent No. 2,329,456. The new polyfunctional copolymers are then formed by replacing part of the acetyl groups with hydroxyl groups through hydrolysis or alcoholysis. During alcoholysis, part of the carboxyl groups may be esterified with the alcohol employed in the reaction. The proportions of vinyl chloride, maleic acid and vinyl acetate employed in the copolymerization, and the degree of hydrolysis or alcoholysis are such that the amounts of chloro, acetyl, carboxyl and hydroxyl groups, computed as vinyl chloride, vinyl acetate, maleic acid and vinyl alcohol, may be respectively by weight from 80 to 95% vinyl chloride, from 1.5 to 10% vinyl acetate, from 0.2 to 10% maleic acid, and from 1.0 to 15% vinyl alcohol. The preferred resins contain from 85 to 95% vinyl chloride, from 1.5 to 10% vinyl acetate, from 0.2 to 6% maleic acid, and from 1 to 10% vinyl alcohol. When part of the carboxyl groups of the original resin are esterified with methanol during alcoholysis, the amount of maleate ester groups introduced, calculated as dimethyl maleate, may vary from 0.68 to 4.4% of the copolymer after alcoholysis.

The hydrolysis or alcoholysis of the copolymer of vinyl chloride, vinyl acetate and maleic acid may be carried out in the presence of either an acid or alkaline catalyst. As compared to acid or alkaline hydrolysis, or alkaline alcoholysis, an alcoholysis reaction employing an anhydrous monohydric alcohol, such as methanol, ethanol or butanol in the presence of an acid catalyst is most selective in removing acetyl groups in preference to the chloro groups, and yields a product of the least color. By regulating the amount of alcohol and time of reaction, the degree of alcoholysis can be carefully controlled. During alcoholysis, part of the carboxyl groups may be esterified, but this is not disadvantageous. It may be compensated for by starting with a copolymer containing more copolymerized maleic acid or the maleate ester group formed may be hydrolyzed later to a carboxyl group. The temperature at which the hydrolysis or alcoholysis reactions are carried out may vary from about 40° C. to 100° C. Suitable acid catalysts include hydrochloric acid and sulfuric acid, whereas alkali metal hydroxides, such as sodium and potassium hydroxide are most suitable as alkaline catalysts. While not preferred, the polyfunctional copolymers may be prepared by saponification reactions, employing stoichiometric amounts of an alkali metal hydroxide.

On heating the polyfunctional copolymers, they become less soluble in acetone. It is believed that this decrease in solubility is due primarily to reaction between hydroxyl groups and carboxyl groups, attached to different molecules, rather than lactone formation, since, from statistical considerations, the average spacing between hydroxyl and carboxyl groups in the polyfunctional copolymers is such that lactone formation should not readily occur. However, a small number of lactone linkages may be present. The polyfunctional copolymers may be made practically insoluble in acetone and resistant to boiling water by baking them with other heat-reactive resins, such as melamine-formaldehyde resins and phenol-formaldehyde resins. The polyfunctional copolymers, while possessing a certain degree of heat-converting properties, contain only a small number of reactive points in relation to the mass of the resin molecule, and, after heat-conversion to a more insoluble and less thermoplastic state, they possess much of the flexibility and resistance to chemicals, particularly alkalies, which characterize the thermoplastic resins predominantly comprising vinyl chloride polymerized therein. Thus, the polyfunctional copolymers are improved products, as compared to the conventional alkyd resins, or the vinyl lactone resins derived from copolymers of vinyl acetate and acrylic acid or maleic anhydride.

The degree of heat conversion can be regulated by proportioning the amounts of hydroxyl groups and carboxyl groups in the polyfunctional copolymers within the limits stated. It is apparent, moreover, that resins of high hydroxyl content must be correspondingly lower in carboxyl content, and that resins high in carboxyl content must contain fewer hydroxyl groups. In any event, however, the hydroxyl and carboxyl groups will be separated, on the average, by several vinyl chloride groups The polyfunctional copolymers may be dissolved in solvents and applied to various surfaces as coatings. The coatings have good adhesion on air-drying to smooth surfaces, such as glass and steel, and it is not essential to bake the coatings. Usually, however, the coatings are baked at temperatures of 250° to 350° F., which results in a coating of higher softening point, reduced thermoplasticity, and improved resistance to solvents. The usual solvents and thinners for vinyl resins may be employed in the coating compositions, such as methyl ethyl ketone, methyl isobutyl ketone, cyclohexanone, isophorone, and the like, and the customary thinners include toluene, xylene, tetrahydronaphthalene and the various cycloparaffins. Esters, such as butyl acetate, containing minor amounts of an alcohol, such as butanol, are good solvents for the polyfunctional copolymers which contain more than about 5% vinyl alcohol.

Plasticizers may be included in the coatings to render them more supple and flexible. Such plasticizers include castor oil, triethylene glycol dioctoate, di(2-ethylhexyl) phthalate, dibutoxyethyl phthalate, tricresyl phosphate, and tri(2-ethylhexyl) phosphate. Heat stabilizing ingredients, such as basic lead sulfate, litharge, lead stearate and calcium stearate may be included in the coatings. Coatings for cloth are usually highly plasticized. The coating on the cloth may be continuous to waterproof the cloth, or it may be discontinuous in which case the cloth is pervious to air. In this latter case, the cloth is usually treated with a water-repellent substance. The best waterproof coatings contain heat-reactive phenol-formaldehyde resins in their formulation.

Coatings for filaments, such as textile filaments and bristles, as well as metal wire, may or may not be plasticized depending on the properties desired. Usually, however, such coatings are baked, and they contain heat-reactive resins to enhance the insolubilization of the polyfunctional copolymers.

Coatings for extended surfaces of steel and other metals usually contain only small amounts of plasticizers, if any. The coatings may be employed for lining food cans, since the polyfunctional copolymers are non-toxic, inert and have good resistance to water, acids and alkalies. The utility in this respect is much increased by the inclusion of heat-reactive resins in the coatings, such as melamine-formaldehyde resins and phenol-formaldehyde resins.

Coatings applied to paper are usually baked, resulting in an impervious, glossy coating on the paper which has good resistance to oils, acids and alkalies. Such coated paper is useful for packaging purposes. The coated paper may still be heat-sealed, even though it has been baked, although somewhat higher temperatures are required.

Adhesives for cloth, tapes, paper, wood and metals are an important field for the polyfunctional copolymers, and their heat-sealing and heat-converting properties adapt them well for this application.

The polyfunctional copolymers may also be modified or reacted through the hydroxyl groups. For instance, they react with aldehydes, such as formaldehyde, glyoxal, and butyraldehyde to form acetal-type resins, which are frequently more soluble than the polyfunctional copolymers. Insolubilization can also be effected by heating the copolymers with chlorine or agents releasing chlorine, such as sulfur chloride; with chromates, such as zinc chromate; and with copper compounds, such as copper acetate. The polyfunctional copolymers may also be reacted with dibasic acids, such as maleic anhydride and succinic acid.

The following examples will serve to illustrate the invention.

*Example 1.*—The following ingredients were charged to a reaction vessel:

| | Parts |
|---|---|
| Copolymer of vinyl chloride, 86%, vinyl acetate, 13%, maleic acid, 1% | 100 |
| Dioxane | 1515 |
| Sodium hydroxide, finely divided solid | 20 |

These materials were heater at 85° to 90° C. for approximately 48 hours. The solution was then neutralized with acetic acid, filtered and the resin precipitated in water. The original copolymer was only partially hydrolyzed and the polyfunctional copolymer formed contained both hydroxyl and acetyl groups. The neutralization of the solution with acetic acid freed the resin of any salt groups formed by reaction of the sodium hydroxide with the carboxyl groups.

In order to hasten the drying of the wet precipitated resin it was placed in the oven and a strong blast of air directed over it. The outer portion, which was dried out and actually reached 250° F., was completely insoluble in acetone. The remainder of the resin which did not reach this temperature because of the moisture present was soluble and was used for the tests to follow: Solutions were made of the hydrolyzed copolymer in acetone, and films were cast from these solutions on steel and on glass. On baking the films for 30 minutes at 250° F., the films were harder and less soluble than the control films of the original copolymer, but were not completely insoluble in acetone. The films of the hydrolized copolymer dried very quickly and they were strongly adherent to glass.

The hydrolyzed copolymers were compatible with various phenol-formaldehyde resins. In particular, they were compatible with a varnish type resin prepared by reacting a mixture of para tertiary-butyl phenol and phenol with formaldehyde in the presence of xylene and solvent naphtha; with a resin formed by reacting para tertiary-butyl phenol with formaldehyde in the presence of an alkaline catalyst; with a resin formed by reacting a mixture of high-boiling phenols with formaldehyde in the presence of an alkaline catalyst and with a resin made by reacting phenol with formaldehyde in the presence of ethanol and an alkaline catalyst.

*Example 2.*—A copolymer of vinyl chloride, 85.8%, vinyl acetate, 8.5%, and maleic acid, 5.7% having a specific viscosity of 0.536, as determined using 1 gram of resin in 100 ml. of methyl isobutyl ketone, was dissolved in 475 parts of dioxane to form a 5% solution, and 10 cc. of hydrochloric acid having a specific gravity of 1.17 and 10 cc. of ethanol were added. This mixture was refluxed at 85° to 95° C. on a steam bath for 24 hours. The acid catalyst was neutralized with an excess of proplyene oxide and the partially hydrolyzed copolymer precipitated in water.

A 10% solution of this hydrolyzed copolymer was prepared and mixed with various phenolic resins. The resin was compatible in a 20:1 mixture with the phenol-formaldehyde resins identified above. On baking these mixtures at 300° F. for 30 minutes, the mixtures became insoluble in acetone. Even when the hydrolyzed copolymer was baked in the absence of the phenolic resins, the baked resin was still only slightly soluble in acetone. All of the coatings showed good resistance to water and had good adhesion.

*Example 3.*—A partially hydrolyzed copolymer of vinyl chloride, 86%, vinyl acetate, 13%, and maleic acid, 1% was dissolved in acetone, and a film cast from the solution. The solvent was removed from the films by baking at a low temperature and the films then immersed in a 10% solution of sulfur chloride in mineral spirits. The films were removed and washed, and they were found to be insoluble in ketones, such as methyl ethyl ketone, although the untreated films were soluble.

*Example 4.*—Three hundred (300) parts of the copolymer of vinyl chloride, vinyl acetate and maleic acid described in Example 2, were dissolved in 1435 parts of 83% methyl acetate and 219 parts of absolute methanol. The solution was heated to 52° C. and 66.6 parts of a 15.7% solution of sulfuric acid in methanol were added. After 22 hours, the catalyst was eliminated by the addition of sodium acetate. The resin was precipitated with methanol and washed. A very light colored alcoholysis product was obtained which contained 87.7% vinyl chloride and 2.3% maleic acid, the remainder being vinyl alcohol, vinyl acetate, and 4.4% methyl maleate. The resin had a specific viscosity at 20° C. of 0.561. The product exhibited improved compatibility with phenol-formaldehyde, melamine-formaldehyde, and urea-formaldehyde heat-converting resins, and showed good adhesion on air-drying.

*Example 5.*—The following coating composition was prepared:

| | Parts |
|---|---|
| Product of Example 4 | 10 |
| Methylisobutyl ketone | 20 |
| Toluene | 20 |
| Alkyd modified melamine-formaldehyde resin | 3 |
| Phosphoric acid, 10% solution | 0.5 |

The resin constituents of this composition were mutually compatible both on air-drying and baking, and showed good adhesive properties. Films of the composition which had been baked for one hour at 340° F. were insoluble in methyl ethyl ketone.

*Example 6.*—The following coating composition was prepared:

| | Parts |
|---|---|
| Product of Example 4 | 10 |
| Methylisobutyl ketone | 20 |
| Toluene | 20 |
| Heat-hardenable phenol-formaldehyde resin | 4 |

The resin constituents of this composition were mutually compatible both on air-drying and baking, and exhibited good adhesive properties. The coating was applied over a phosphatized black iron panel, and baked for 15 minutes at 375° F. After immersing the coated panel in boiling water for ½ hour, the adhesion was still good, and there was no blushing or blistering.

*Example 7.*—A copolymer of vinyl chloride, 85.4%, vinyl acetate, 13.87%, and maleic acid, 0.73%, having a specific viscosity of 0.567, was hydrolyzed as described in Example 4, except that the reaction time was extended to 46 hours. An alcoholysis product containing vinyl chloride, 90.2%, vinyl alcohol, 5.3%, maleic acid, 0.22%, and the remainder vinyl acetate and 0.68% of maleate ester, having a specific viscosity of 0.648 was obtained.

The hydrolyzed resin was compatible with gums and resins commonly used in lacquers, such as ester gum, alkyd resins, phenolic resins, urea resins and the like. The resin had good adhesion to smooth surfaces upon air-drying solutions containing it.

The above examples describe the preferred embodiments of the invention, but other modifications are included within the scope of the invention as defined in the appended claims.

I claim:

1. Process for making a copolymer of vinyl chloride, vinyl acetate, maleic acid and vinyl alcohol containing from 85 to 95% vinyl chloride, from 1.5 to 10% vinyl acetate, from 0.2 to 6% maleic acid and from 1 to 10% vinyl alcohol, which comprises heating a conjoint polymer consisting of vinyl chloride, vinyl acetate and maleic acid with a monohydric alcohol and partially replacing the acetyl radicals of such conjoint polymer with hydroxyl groups, the amounts of vinyl chloride, vinyl acetate and maleic acid in said conjoint polymer being stoichiometrically proportioned so as to yield copolymers of the said composition, the proportions of alcohol and the duration of the heating being such that the alcoholized copolymer contains from 0.2 to 6% maleic acid and from 1 to 10% vinyl alcohol.

2. A copolymer consisting of vinyl chloride, vinyl acetate, maleic acid, methyl maleate and vinyl alcohol containing from 85 to 95% vinyl chloride, from 1.5 to 10% vinyl acetate, from 0.2 to 6% maleic acid, from 0.68 to 4.4% methyl maleate calculated as dimethyl maleate and from 1 to 10% vinyl alcohol.

3. A coating composition comprising a solution in an organic solvent of a copolymer consisting of vinyl chloride, vinyl acetate, maleic acid, methyl maleate and vinyl alcohol containing from 85 to 95% vinyl chloride, from 1.5 to 10% vinyl acetate, from 0.2 to 6% maleic acid, from 0.68 to 4.4% methyl maleate calculated as dimethyl maleate and from 1 to 10% vinyl alcohol.

4. A coating composition comprising a solution in an organic solvent of a melamine-formaldehyde resin and a copolymer consisting of vinyl chloride, vinyl acetate, maleic acid, methyl maleate and vinyl alcohol containing from 85 to 95% vinyl chloride, from 1.5 to 10% vinyl acetate, from 0.2 to 6% maleic acid, from 0.68 to 4.4% methyl maleate calculated as dimethyl maleate and from 1 to 10% vinyl alcohol.

5. A coating composition comprising a solution in an organic solvent of a phenol-formaldehyde resin and a copolymer consisting of vinyl chloride, vinyl acetate, maleic acid, methyl maleate and vinyl alcohol containing from 85 to 95% vinyl chloride, from 1.5 to 10% vinyl acetate, from 0.2 to 6% maleic acid, from 0.68 to 4.4% methyl maleate calculated as dimethyl maleate and from 1 to 10% vinyl alcohol.

RICHARD W. QUARLES.

REFERENCES CITED

The following references are of record in the file of this patent:

UNITED STATES PATENTS

| Number | Name | Date |
|---|---|---|
| 2,047,398 | Voss et al. | July 14, 1936 |
| 2,147,154 | Fikentscher | Feb. 14, 1939 |
| 2,299,433 | Stoner et al. | Oct. 20, 1942 |
| 2,306,071 | McNally et al. | Dec. 22, 1942 |
| 2,329,456 | Campbell | Sept. 14, 1943 |

Certificate of Correction

Patent No. 2,458,639.

January 11, 1949.

RICHARD W. QUARLES

It is hereby certified that errors appear in the printed specification of the above numbered patent requiring correction as follows:

Column 2, line 5, for "eractions" read *reactions*; column 3, line 72, for the word "soluble" read *insoluble*; column 4, line 15, for "heater" read *heated*; line 39, for "hydrolized" read *hydrolyzed*;

and that the said Letters Patent should be read with these corrections therein that the same may conform to the record of the case in the Patent Office.

Signed and sealed this 26th day of April, A. D. 1949.

[SEAL]

THOMAS F. MURPHY,
*Assistant Commissioner of Patents.*